Oct. 14, 1958     C. GERST     2,855,807
TRANSMISSION

Filed Feb. 2, 1955     3 Sheets-Sheet 1

INVENTOR.
CHRIS GERST
BY
ATT.

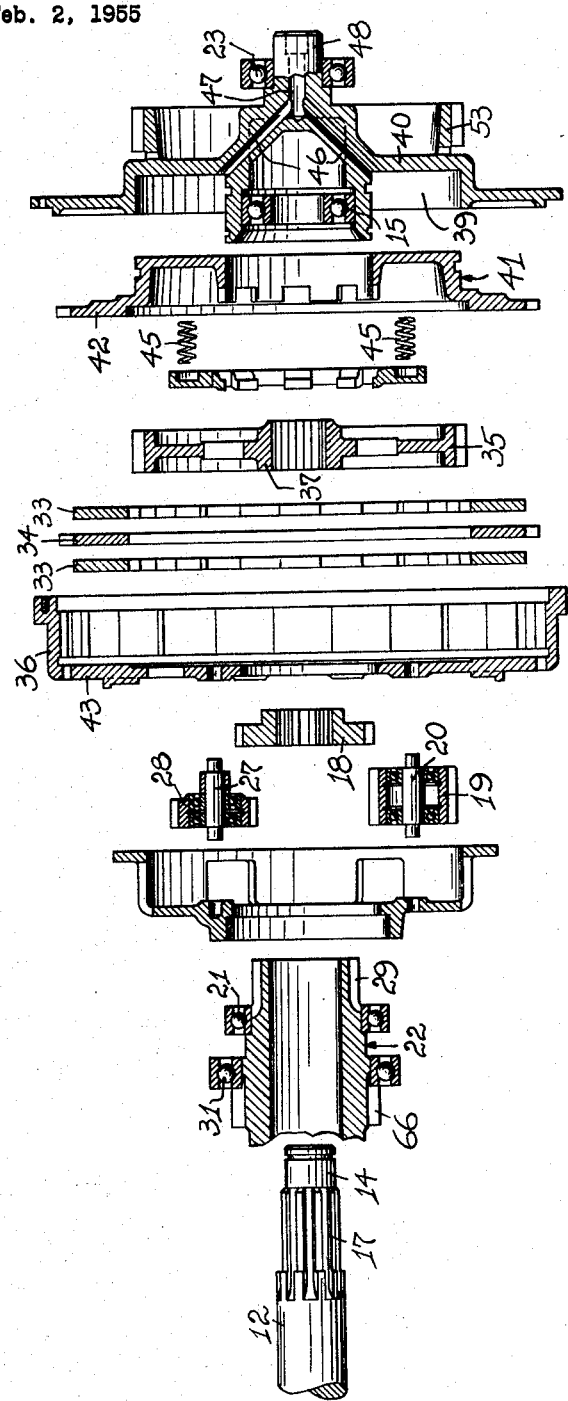

ure 14, 1958

2,855,807
TRANSMISSION

Chris Gerst, Detroit, Mich., assignor to The Transmission & Gear Company, Dearborn, Mich., a corporation of Michigan Application February 2, 1955, Serial No. 485,701

9 Claims. (Cl. 74—740)

This invention relates to reduction transmission mechanism and is particularly directed to hydraulically actuated transmission mechanism adapted to be used for tractors, heavy road machinery, etc.

The primary object of the invention is the provision of a hydraulically actuated, compact, reversing, transmission mechanism in which input and output shaft means are coupled with each other by hydraulically actuated planetary reversing gearing means adapted to effect quick and smooth shifting of the direction of rotation of the output shaft from forward to reverse and vice versa.

Another object of the invention is the provision of a hydraulically actuated, compact, reversing, multi-speed reduction transmission mechanism which embodies input and output shaft means coupled with each other by hydraulically actuated combined planetary reversing gearing and multi-speed gearing, the gearings cooperating and the hydraulic actuation effecting quick and smooth shifting of the gearings to rotate the output shaft means at various forward and reverse speeds.

A further object of the invention is the provision of a hydraulically actuated, compact, reversing, multi-speed reduction transmission mechanism which embodies an input shaft, hydraulically actuated reversing planetary gearing coupled with the input shaft, shiftable multi-speed gearing including a countershaft coupled with the hydraulically actuated reversing planetary gearing and a main driven shaft, and output shaft means formed by two output shafts one of which is the said main driven shaft of the multi-speed gearing and the other one of which is extended parallel to the main driven shaft and releasably geared thereto to permit selective quick and smooth shifting of the transmission mechanism for rotation of the one output shaft at various forward and reverse speeds and selective rotation of the other output shaft at the same various forward and reverse speeds.

Further objects and novel features of construction, combination and relation of parts by which the objects in view have been obtained will appear and are set forth in detail in the course of the following specification. The drawings accompanying and forming part of the specification illustrate a certain practical embodiment of the invention, but it will be apparent as the specification proceeds that the structure shown may be modified and changed in various ways without departure from the true spirit and broad scope of the invention.

In the drawings:

Fig. 3 is an exploded figure of the hydraulically actuated reversing planetary gearing of the transmission mechanism showing the individual parts of such planetary gearing separated from each other in properly aligned relation with respect to each other.

Figure 1:
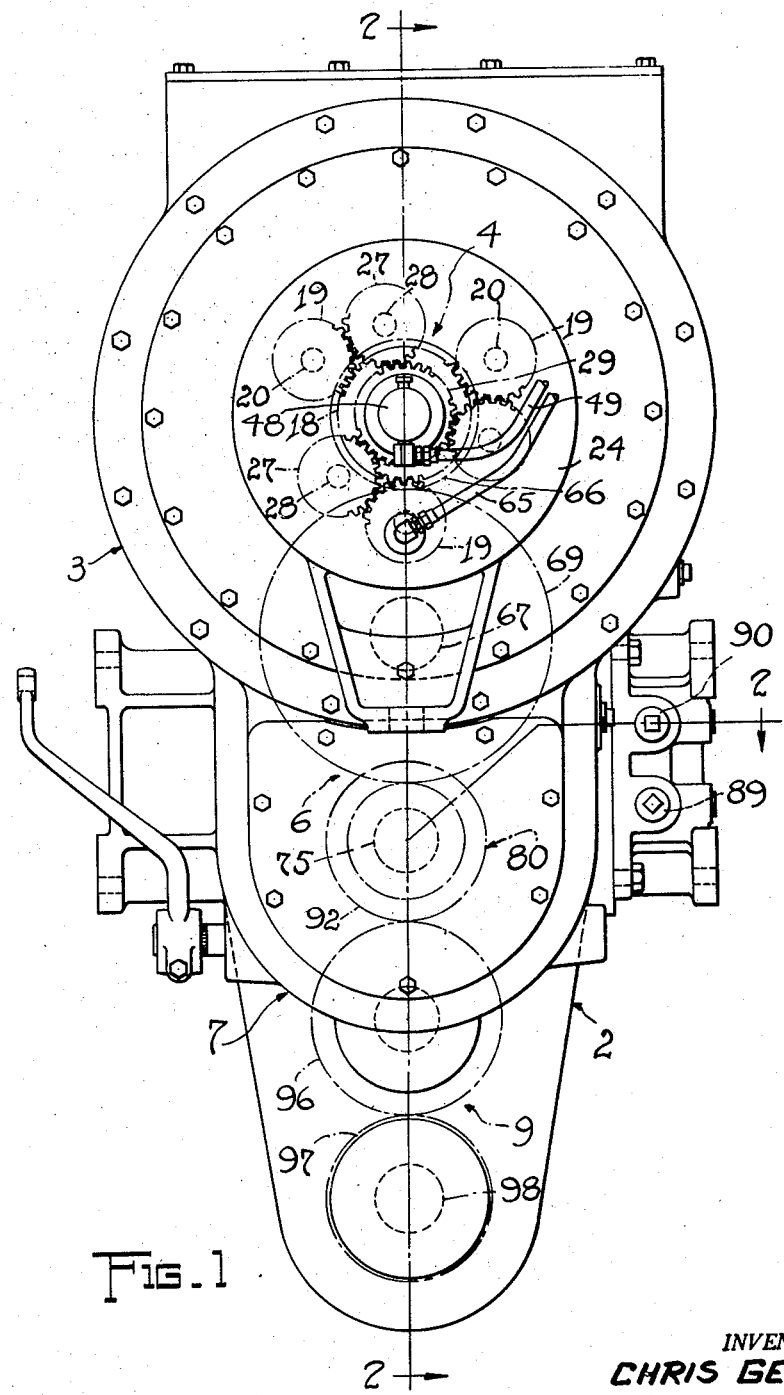
Fig. 1 is an end view of a hydraulically actuated reversing multi-speed reduction transmission mechanism constructed in accordance with the invention.
Figure 2:
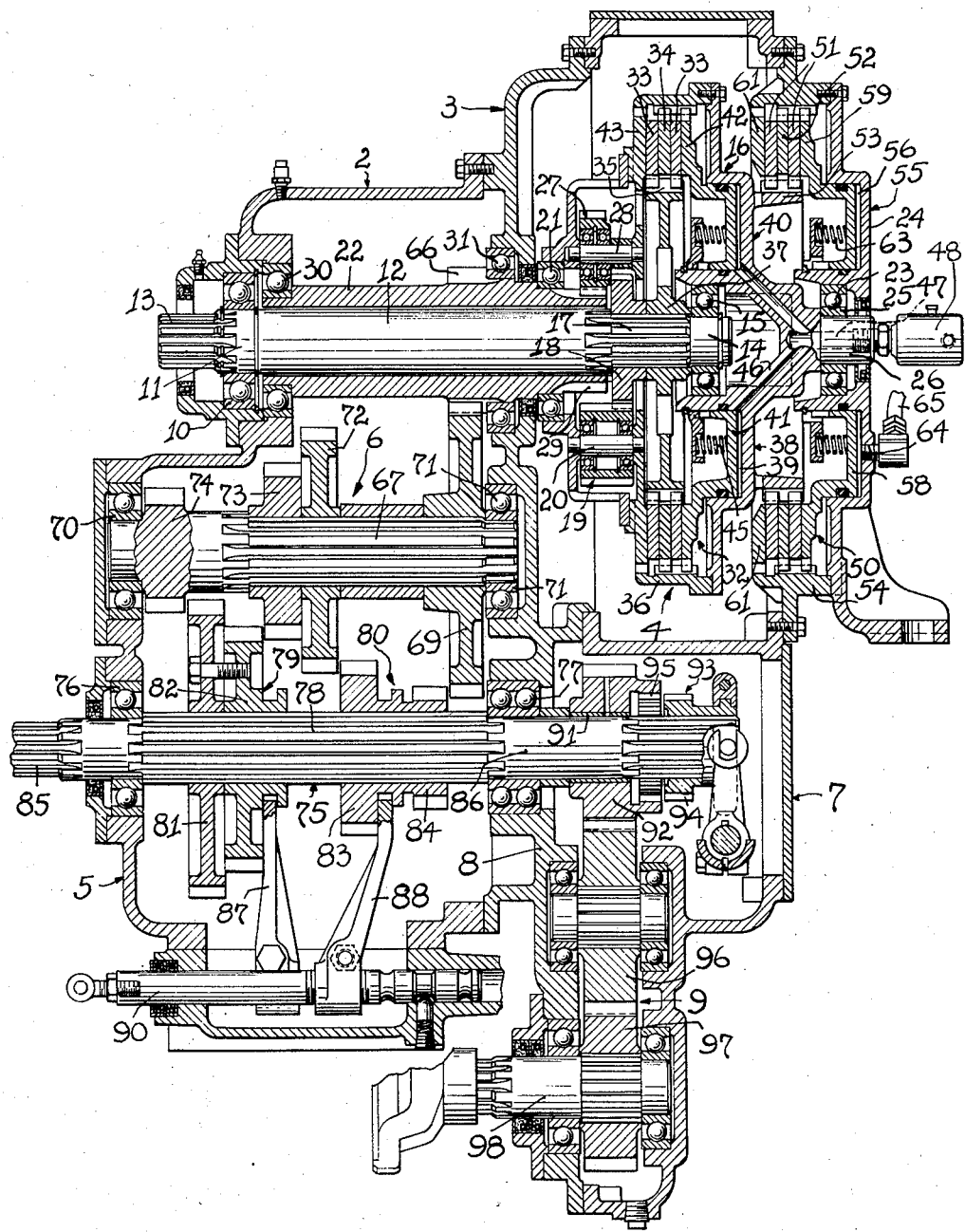
Fig. 2 is a sectional view through the transmission mechanism shown in Fig. 1, the section being taken on line 2—2 of said figure.

Referring now more in detail to the exemplified form of the invention shown in the drawings, numeral 2 denotes a composite gear housing embodying a housing portion 3 mounting a hydraulically actuated reversing planetary transmission mechanism 4, a housing portion 5 mounting a shiftable multi-speed transmission 6 which is coupled with the planetary transmission mechanism 4, and a housing portion 7 extended from side wall 8 of housing portion 5 and mounting gear 9 coupled with multi-speed transmission 6.

Housing portion 3 rotatably supports in ball bearing 10 one end 11 of an input shaft 12 which extends outside of housing 2 and has its extended portion splined at 13 to permit coupling of the input shaft with an engine or motor (not shown). Input shaft 12 has its other end 14 directly coupled with hydraulically actuated reversing planetary transmission mechanism 4, which other end is rotatably supported in a ball bearing 15 in the planet gear carrier 16 of said mechanism in a manner later to be described. Input shaft 12 additionally mounts on splined portion 17 a sun gear 18 of the drive structure of planetary transmission mechanism 4, which sun gear meshes with planet gears 19 journaled on shaft 20 of planet gear carrier 16. This planet gear carrier is freely rotatably supported by ball bearing 21 supported on tubular shaft 22 which concentrically encircles input shaft 12 and ball bearing 23 which is supported in side wall 24 of housing portion 3 and has extended through its inner ring 25 a stud-like extension 26 of planet gear carrier 16. The planet gears 19 mesh with idler planet gears 27 which are journaled on shafts 28 mounted on planet gear carrier 16 and these idler planet gears mesh with a gear 29 formed integrally with the tubular shaft 22 previously referred to. Tubular shaft 22 has input shaft 12 axially extended therethrough and is journaled in housing portion 3 in ball bearings 30 and 31.

The planet gear carrier 16 encircles the sun gear 18, the planet gears 19 and the idler planet gears 27 and, furthermore, forms part of a spring-released, hydraulically actuated clutch structure 32 which is directly coupled with the drive structure of reversing planetary transmission mechanism 4. This hydraulically actuated spring-released clutch structure includes cooperating friction disks 33 and 34 non-rotatably and laterally shiftably supported on splined circumferential flanges 35 and 36. The friction disks 33 are laterally shiftably supported on splined circumferential flange 35 of body portion 37 of clutch structure 32, which body portion is mounted on the splined portion 17 of input shaft 12, and the friction disk 34 is laterally shiftably supported on the internally splined circumferential flange 36 which forms part of the planet gear carrier 16.

Friction disks 33 and 34 are shifted into frictional engagement by a cylinder-piston arrangement 38 embodying a cylinder 39 which is formed by a chamber of ring-shaped cross section in rear wall portion 40 of planet gear carrier 16 and a piston 41 which is formed by a ring-shaped member shaped to include a ring-shaped, plate-like clamping portion 42 extended opposite one of the two friction disks 33. In clutching operations, clamping member 42 cooperates with a stationary backing plate member 43 which is formed by a vertical wall portion of planet gear carrier 16 and this backing plate member is extended opposite the other one of the two friction disks 33. Clutching action of cylinder-piston arrangement 38, which is spring-released by coil springs 45, is effected by fluid under pressure fed from a source of supply (not shown) into cylinder 39 through fluid passages 46 which communicate through bore 47 in stud-like extension 26, rotary fluid seal 48 and pressure hose 49 with such source of pressure fluid supply.

The rotation of planet gear carrier 16 can be arrested by a spring-released, hydraulically actuated friction brake arrangement 50 coaxially arranged with respect to clutch structure 32. This brake arrangement embodies friction disks 51 and 52 which are non-rotatably and laterally shiftably supported on splined circumferential flanges 53 and 54. The friction disks 51 are laterally shiftably supported on splined circumferential flange 53 extended laterally from planet gear carrier 16 and friction disks 52 are laterally shiftably supported on stationary splined circumferential flange 54 of housing 2.

The friction disks 51 and 52 are shifted into frictional engagement by a cylinder-piston arrangement 55 embodying a cylinder 56 formed by a chamber of ring-shaped cross section in the side wall 24 of housing 2 and a piston 58 which is formed by a ring-shaped member 59 shaped to include a ring-shaped clamping portion 60 extended opposite one of the two friction disks 51. In braking operations, clamping portion 60 cooperates with a stationary, ring-shaped, vertically arranged backing plate member 61 formed as an integral portion of housing 2 and extended opposite side wall 24.

Braking action of cylinder-piston arrangement 55, which is spring-released by coil springs 63, is effected by fluid under pressure fed from a source of supply (not shown) into cylinder 56 through passage 64 and pressure hose 65 connected to such source of pressure fluid.

Tubular shaft 22 which forms one of the elements of the reversing planetary transmission is directly geared by gear 66 formed integrally with said tubular shaft to countershaft 67 of multi-speed transmission 6, gear 66 meshing with large gear 69 on the countershaft 67 journaled in ball bearings 70, 71 and mounting two other gears 72, 73 and at one end portion a pinion 74. This arrangement of gears 69, 72, 73 and pinion 74 on countershaft 67 permits differential selective coupling of said shaft with a shaft 75 which is the main output shaft of the four-speed forward and reverse reduction transmission. Shaft 75 is mounted in ball bearings 76, 77 and shiftably and non-rotatably supports on splined portion 78 two double gears 79 and 80, the double gear 79 including a large gear 81 and a smaller gear 82, and the double gear 80 including a larger gear 83 and a smaller gear 84. In addition, shaft 75 extends its one end portion 85 outside of gear housing 2 and its other end portion 86 into housing portion 7 for a purpose hereinafter to be described. The double gears 79 and 80 are shifted by fork members 87 and 88 which are supported by shiftable operating shafts 89, 90 actuated in any suitable standard manner. End portion 86 of shaft 75 freely rotatably supports on a bushing 91 a gear 92 and shaft 75 slidably and non-rotatably supports on said end portion 86 a clutch member 93, with clutch teeth 94 cooperating with clutch teeth 95 on gear 92 in non-rotatably coupling same with shaft 75 when clutch member 93 is shifted toward gear 92.

Gear 92 meshes with an idler gear 96 which in turn meshes with a gear 97 splined to a shaft 98 which is journaled in housing 7 arranged parallel to output shaft 75 and extended outside of housing portion 7 to provide a selectively operable additional output shaft for the transmission.

The described transmission may be used as drive transmission for front and rear wheels of tractors and other heavy road machinery and provides a compact multi-speed reduction transmission unit with four forward and reverse speeds, the unit permitting quick and smooth shifting from forward to reverse, and vice versa, without arresting or decreasing the rotary speed of the prime mover driving the transmission.

Having thus described my invention what I claim is:

1. In a power drive transmission a housing, hydraulically actuated planetary type reversing gearing in said housing including a sun gear, planet gears and a planet gear carrier having at one side a stud-like extension journaled in a wall of said housing and extended outside thereof, friction clutch means arranged within the planet gear carrier, cylinder piston actuating means for the friction clutch means within the planet gear carrier, friction brake means for the planet gear carrier including brake elements on the housing and the planet gear carrier outside thereof, cylinder piston actuating means for the friction brake means, and fluid passage means in the housing and the stud-like extension of the planet gear carrier adapted to selectively carry fluid to the cylinder piston actuating means for the friction clutch means and the cylinder piston actuating means for the friction brake means.

2. A power drive transmission as described in claim 1, including an input shaft coupled with the planetary-type gearing, said input shaft having the one end portion journaled in a wall of said housing and the other end portion journaled in the planet gear carrier, a tubular shaft journaled in said housing and concentrically encircling the input shaft, said tubular shaft coupled with the planetary-type gearing and freely rotatably mounting the other end of the planet gear carrier.

3. A power drive transmission as described in claim 1, wherein the friction clutch means and the friction brake means are spring-released, and wherein the cylinder of the cylinder-piston means for the friction brake means is rigidly arranged adjacent a wall of said housing to permit feeding of hydraulic fluid through an opening in said wall into the cylinder of the friction brake means and individual, selective actuation of the friction clutch means and the friction brake means.

4. In a power drive transmission comprising a reversing planetary-type gearing and a change speed gearing, a housing mounting the planetary-type gearing and change speed gearing, said planetary-type gearing including a planet gear carrier having at one end a stud-like extension journaled in a wall of the housing and extended through the wall outside of the housing, an input shaft coupled with the planetary-type gearing and journaled at one end in the planet gear carrier, a tubular output shaft for said planetary-type gearing encircling the input shaft and journaled in said housing, said planet gear carrier having its other end freely rotatably mounted on the tubular output shaft, a countershaft geared to the tubular output shaft including driving gears of different sizes rigidly mounted on the countershaft and a primary output shaft for the transmission arranged parallel to the countershaft and including driven gears shiftably and non-rotatably carried by the primary output shaft of the transmission to be selectively meshed with the driving gears on said countershaft.

5. A power drive transmission as described in claim 4, including a secondary output shaft for the transmission arranged parallel to the primary output shaft thereof, and clutch-controlled gearing coupling said secondary output shaft with the primary output shaft, said clutch-controlled gearing including a gear freely rotatably mounted on the primary output shaft of the transmission and a releasable clutch coupling such gear with said primary output shaft, whereby by selective engagement and disengagement of the releasable clutch said gear may be driven by the primary output shaft and impart selective rotation to the secondary output shaft.

6. A power drive transmission as described in claim 5, wherein the clutch-controlled gearing coupling the primary output shaft with the secondary output shaft effects rotation of the primary and secondary output shafts of the transmission in the same direction.

7. A power drive transmission as described in claim 5, wherein the clutch-controlled gearing coupling the primary output shaft with the secondary output shaft effects rotation of the primary and secondary output shafts of the transmission in the same direction and at the same speed ratio.

8. A power drive transmission as described in claim 5, wherein the primary output shaft and the secondary output shaft are arranged above each other, and wherein the input shaft, the primary output shaft and the secondary output shaft are arranged parallel to each other and extended from the transmission in the same direction.

9. A power drive transmission as described in claim 5, including a chambered housing with a first chamber for the planetary-type gearing, a second chamber for the change speed gearing having the input shaft extended therethrough into the first chamber and having the coupling connection of the planetary-type gearing and change speed gearing arranged therein, and a third chamber for the clutch-controlled gearing having the secondary output shaft journaled therein, the third chamber being arranged below the first chamber and adjacent the second chamber to extend the primary output shaft through the second chamber into the third chamber and the secondary output shaft out of said third chamber below the second chamber.

References Cited in the file of this patent

UNITED STATES PATENTS

| | | |
|---|---|---|
| 1,619,701 | Chorlton | Mar. 1, 1927 |
| 1,996,815 | Kimpton et al. | Apr. 9, 1935 |
| 2,085,805 | Jessen | July 6, 1937 |
| 2,384,182 | Lewis | Sept. 4, 1945 |
| 2,439,079 | Davidson | Apr. 6, 1948 |
| 2,447,136 | Putz | Aug. 17, 1948 |
| 2,528,314 | Langdon | Oct. 31, 1950 |
| 2,576,478 | Beckwith | Nov. 27, 1951 |
| 2,724,290 | Gerst | Nov. 22, 1955 |

FOREIGN PATENTS

| | | |
|---|---|---|
| 637,965 | Germany | Nov. 7, 1936 |
| 656,074 | Germany | Jan. 28, 1938 |
| 727,628 | Great Britain | Apr. 6, 1955 |